United States Patent
Sugimura et al.

(10) Patent No.: US 11,186,202 B2
(45) Date of Patent: Nov. 30, 2021

(54) POWER SUPPLY DEVICE

(71) Applicant: Yazaki Corporation, Tokyo (JP)

(72) Inventors: Kazuo Sugimura, Shizuoka (JP);
Mitsuaki Morimoto, Shizuoka (JP);
Kazuya Tsubaki, Shizuoka (JP);
Eiichiro Oishi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 35 days.

(21) Appl. No.: 16/924,136

(22) Filed: Jul. 8, 2020

(65) Prior Publication Data
US 2021/0009005 A1    Jan. 14, 2021

(30) Foreign Application Priority Data

Jul. 11, 2019   (JP) .............................. JP2019-129103

(51) Int. Cl.
| | | |
|---|---|---|
| *H02J 7/00* | (2006.01) | |
| *H02J 7/14* | (2006.01) | |
| *B60L 58/19* | (2019.01) | |
| *B60L 53/62* | (2019.01) | |
| *B60L 58/12* | (2019.01) | |

(52) U.S. Cl.
CPC ............... *B60L 58/19* (2019.02); *B60L 53/62* (2019.02); *B60L 58/12* (2019.02)

(58) Field of Classification Search
USPC ...................................................... 320/109
See application file for complete search history.

(56) References Cited

U.S. PATENT DOCUMENTS

| | | | | |
|---|---|---|---|---|
| 6,087,803 | A * | 7/2000 | Eguchi ................. | H01M 10/48 320/106 |
| 6,331,764 | B1 * | 12/2001 | Oglesbee ............ | H02J 7/00308 320/136 |
| 2006/0186857 | A1 * | 8/2006 | Matty ................... | H01M 10/46 320/122 |
| 2010/0079108 | A1 * | 4/2010 | Monden ................ | H02J 7/0014 320/116 |
| 2012/0217797 | A1 * | 8/2012 | Butzmann ............... | B60L 58/10 307/9.1 |
| 2015/0008874 | A1 * | 1/2015 | Sidorenko ............. | H02J 7/0022 320/107 |

(Continued)

FOREIGN PATENT DOCUMENTS

| | | |
|---|---|---|
| DE | 10 2016 008 052 A1 | 2/2017 |
| DE | 10 2017 206 834 A1 | 10/2018 |
| JP | 2018-33263 A | 3/2018 |

*Primary Examiner* — Alexis B Pacheco
(74) *Attorney, Agent, or Firm* — Kenealy Vaidya LLP

(57) ABSTRACT

In a power supply device, a battery switching unit is a circuit capable of switching a series-connected relay, a parallel-connected relay, a parallel-connected relay, and a parallel-connected relay to switch to a series circuit connecting a first battery and a second battery in series or a parallel circuit connecting the first battery and the second battery in parallel. When charging the first battery and the second battery, a controller controls the battery switching unit to switch to a parallel circuit, controls the parallel-connected relay based on voltages applied to a first cathode terminal and a first anode terminal, and further controls the parallel-connected relay based on voltages applied to a second cathode terminal and a second anode terminal.

8 Claims, 9 Drawing Sheets

(56) References Cited

U.S. PATENT DOCUMENTS

| | | | |
|---|---|---|---|
| 2015/0340886 A1* | 11/2015 | Sung | H02J 7/0016 |
| | | | 320/118 |
| 2018/0056798 A1 | 3/2018 | Syouda | |
| 2018/0345806 A1 | 12/2018 | Lee et al. | |
| 2020/0055412 A1 | 2/2020 | Krieg et al. | |
| 2020/0180470 A1 | 6/2020 | Doersam et al. | |

* cited by examiner

POWER SUPPLY DEVICE

CROSS-REFERENCE TO RELATED APPLICATION(S)

The present application claims priority to and incorporates by reference the entire contents of Japanese Patent Application No. 2019-129103 filed in Japan on Jul. 11, 2019.

BACKGROUND OF THE INVENTION

1. Field of the Invention

The present invention relates to a power supply device.

2. Description of the Related Art

As a power supply device, for example, Japanese Patent Application Laid-open No. 2018-33263 has described a quick charging device which includes a first battery module and a second battery module, and connects the first and second battery modules in series or in parallel when charging and discharging the first and second battery modules.

It has been desired that the above-mentioned quick charging device described in Japanese Patent Application Laid-open No. 2018-33263 can be properly charged when the first and second battery modules are connected in parallel in a state where the charging rates of the first and second battery modules are different, for example.

SUMMARY OF THE INVENTION

The present invention has been made in view of the above, and an object of the present invention is to provide a power supply device capable of properly charging and discharging.

In order to achieve the above mentioned object, a power supply device according to one aspect of the present invention includes a first battery mounted on a vehicle and capable of storing electric power; a second battery mounted on the vehicle and capable of storing electric power; a switching unit capable of switching a series-connected switch, a first parallel-connected switch, a second parallel-connected switch and a third parallel-connected switch to switch to a series circuit connecting the first battery and the second battery in series or a first parallel circuit connecting the first battery and the second battery in parallel; an input unit that is connected to an external charger, and inputs electric power supplied from the external charger; and a controller configured to control the switching unit to switch to the series circuit or the first parallel circuit, wherein the series-connected switch is provided between a positive electrode of the second battery and a negative electrode of the first battery, and energizes or interrupts between the positive electrode of the second battery and the negative electrode of the first battery, the first parallel-connected switch has a first parasitic diode, a first cathode terminal of the first parasitic diode is connected to a positive electrode of the first battery, and a first anode terminal of the first parasitic diode is connected to a positive electrode of the input unit to energize or interrupt between the positive electrode of the first battery and the positive electrode of the input unit, the second parallel-connected switch has a second parasitic diode, a second cathode terminal of the second parasitic diode is connected to the positive electrode of the second battery, and a second anode terminal of the second parasitic diode is connected to the positive electrode of the input unit to energize or interrupt between the positive electrode of the second battery and the positive electrode of the input unit, the third parallel-connected switch is provided between the negative electrode of the first battery and a negative electrode of the second battery, and energizes or interrupts between the negative electrode of the first battery and the negative electrode of the second battery, and when charging the first battery and the second battery, the controller controls the switching unit to switch to the first parallel circuit, controls the first parallel-connected switch based on voltages applied to the first cathode terminal and the first anode terminal, and further controls the second parallel-connected switch based on voltages applied to the second cathode terminal and the second anode terminal.

According to another aspect of the present invention, in the power supply device, it is preferable that when, in charging the first battery and the second battery, the voltage applied to the first cathode terminal is less than the voltage applied to the first anode terminal, the controller turns on the first parallel-connected switch to energize between the positive electrode of the first battery and the positive electrode of the input unit, when the voltage applied to the first cathode terminal is equal to or higher than the voltage applied to the first anode terminal, the controller turns off the first parallel-connected switch to interrupt between the positive electrode of the first battery and the positive electrode of the input unit, when the voltage applied to the second cathode terminal is less than the voltage applied to the second anode terminal, the controller turns on the second parallel-connected switch to energize between the positive electrode of the second battery and the positive electrode of the input unit, and when the voltage applied to the second cathode terminal is equal to or higher than the voltage applied to the second anode terminal, the controller turns off the second parallel-connected switch to interrupt between the positive electrode of the second battery and the positive electrode of the input unit.

According to still another aspect of the present invention, in the power supply device, it is preferable that the third parallel-connected switch has a third parasitic diode, a third cathode terminal of the third parasitic diode is connected to the positive electrode of the second battery via the series-connected switch, and a third anode terminal of the third parasitic diode is connected to the negative electrode of the second battery, when a voltage applied to the third cathode terminal is less than a voltage applied to the third anode terminal, the controller turns on the third parallel-connected switch to energize between the positive electrode and the negative electrode of the second battery, and when the voltage applied to the third cathode terminal is equal to or higher than the voltage applied to the third anode terminal, the controller turns off the third parallel-connected switch to interrupt between the positive electrode and the negative electrode of the second battery.

According to still another aspect of the present invention, in the power supply device, it is preferable that the switching unit can switch a fourth parallel-connected switch, a fifth parallel-connected switch, and the third parallel-connected switch to switch to a second parallel circuit connecting the first battery and the second battery in parallel, and when charging the first battery and the second battery, the controller controls the switching unit, charges by one circuit of the first parallel circuit or the second parallel circuit, and does not charge by another circuit of the first parallel circuit or the second parallel circuit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Some modes (embodiments) for carrying out the present invention will be described in detail with reference to the drawings. The present invention is not limited by the contents described in the following embodiments. Besides, the components described below include those which can be easily contemplated by a person skilled in the art, and those which are substantially the same. Further, the configurations described below can be combined appropriately. In addition, various omissions, replacements or changes of the configurations may be made without departing from the spirit or scope of the gist of the present invention.

EMBODIMENTS

Figure 1:
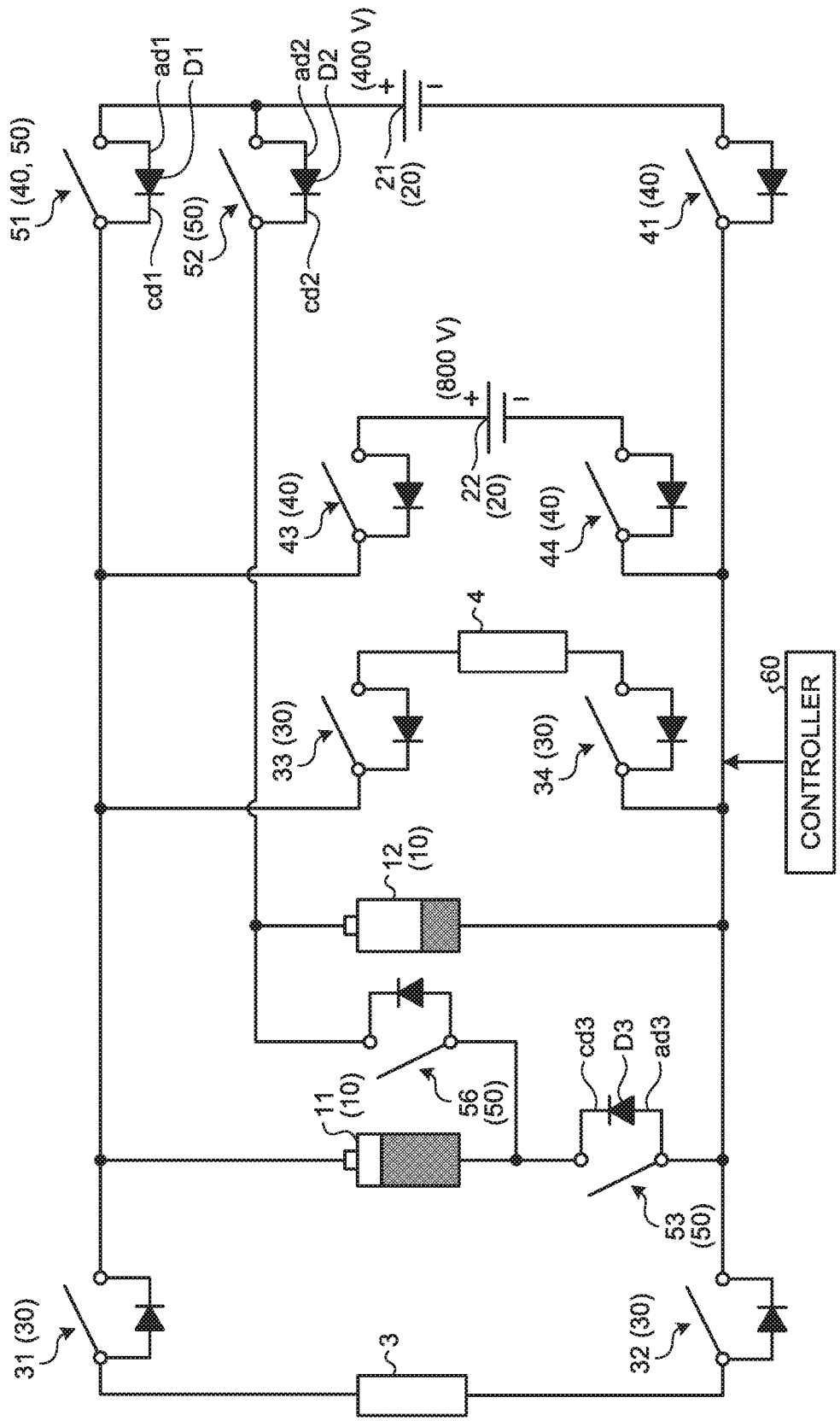
FIG. 1 is a schematic diagram illustrating a configuration example of a power supply device according to an embodiment.
Figure 2:
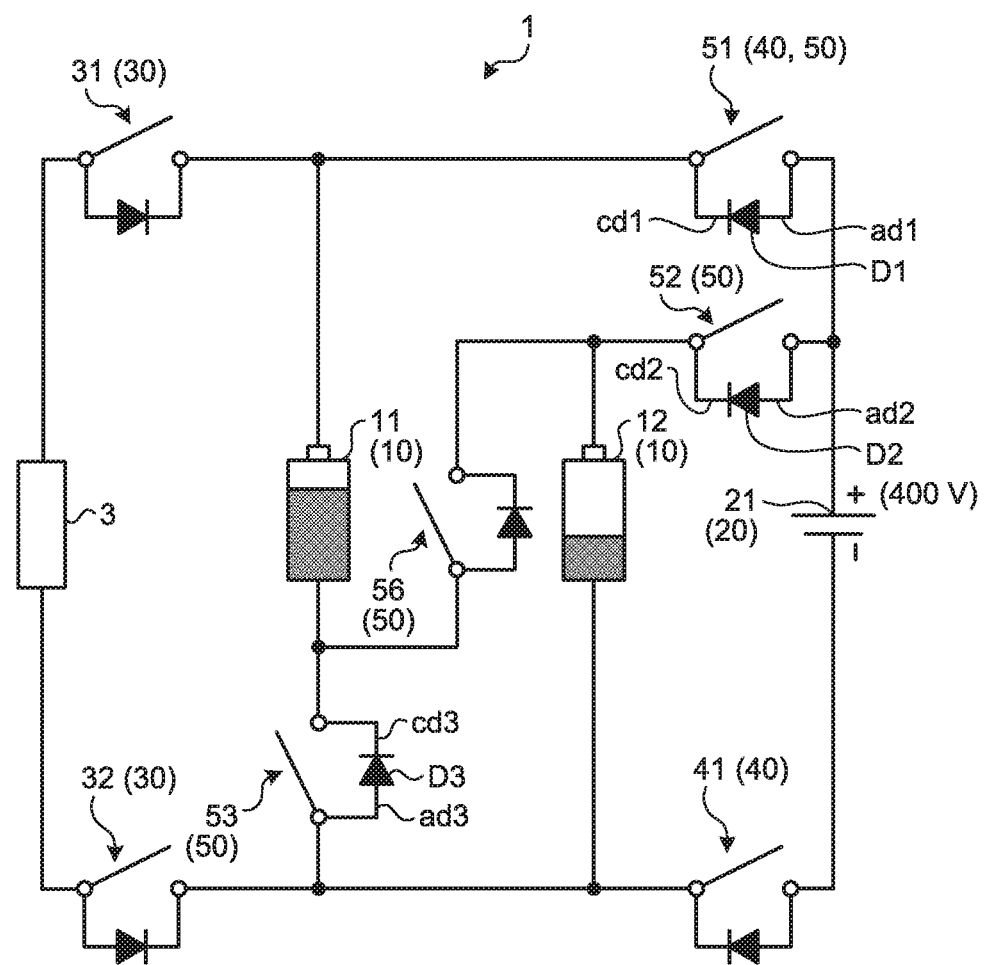
FIG. 2 is a schematic diagram illustrating a configuration example of a part of the power supply device according to the embodiment.
Figure 3:
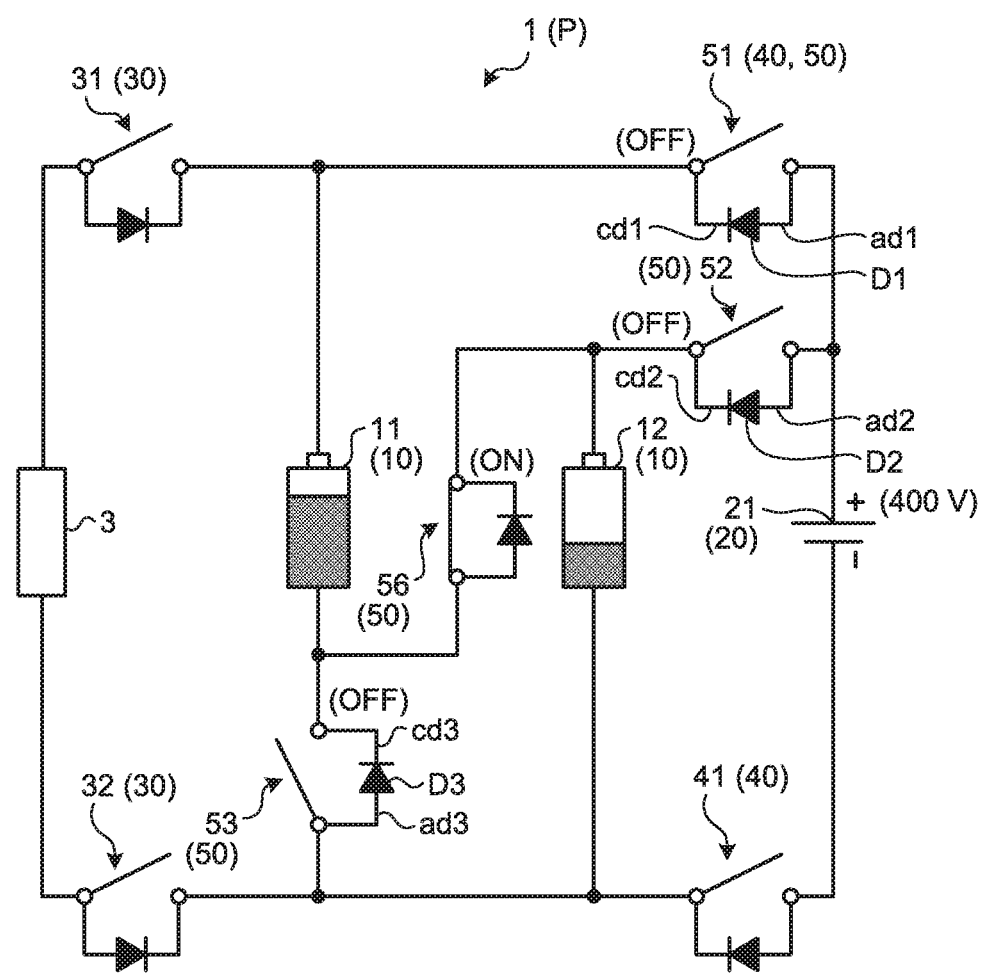
FIG. 3 is a schematic diagram illustrating a configuration example of a series circuit according to the embodiment.
Figure 4:
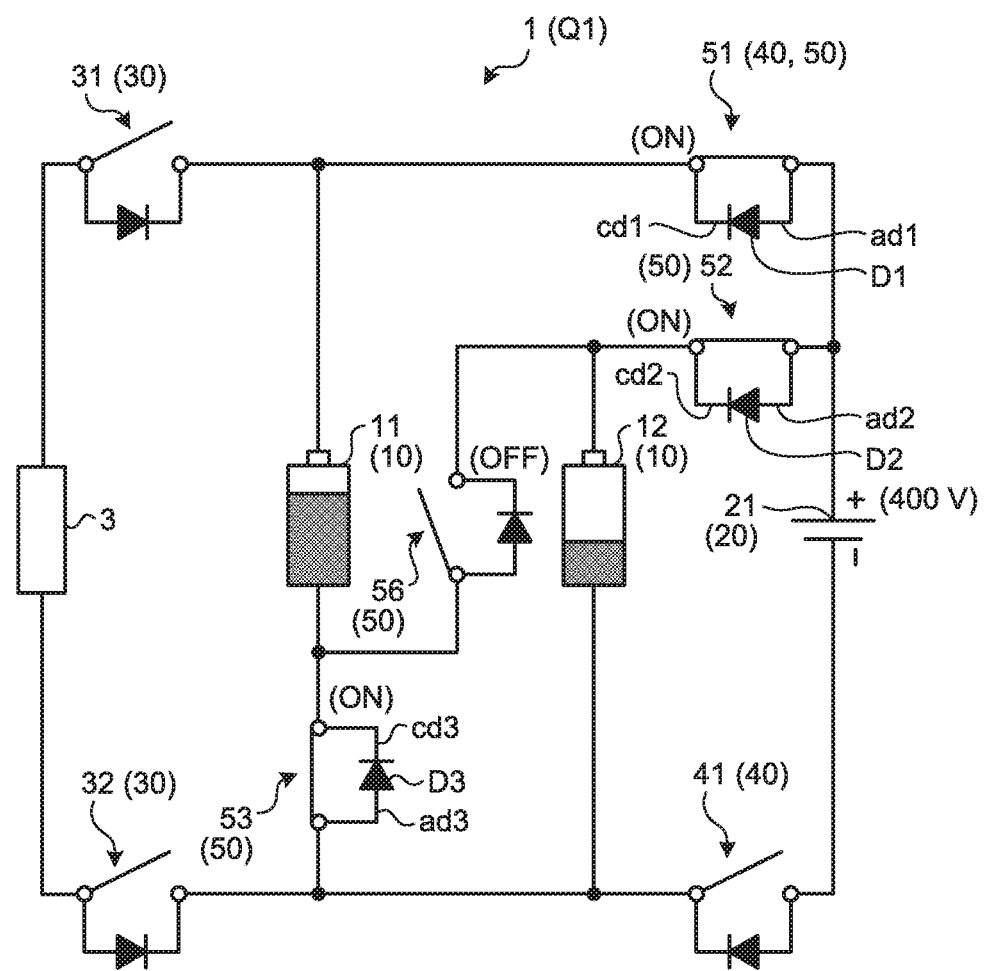
FIG. 4 is a schematic diagram illustrating a configuration example of a parallel circuit according to the embodiment.
Figure 5:
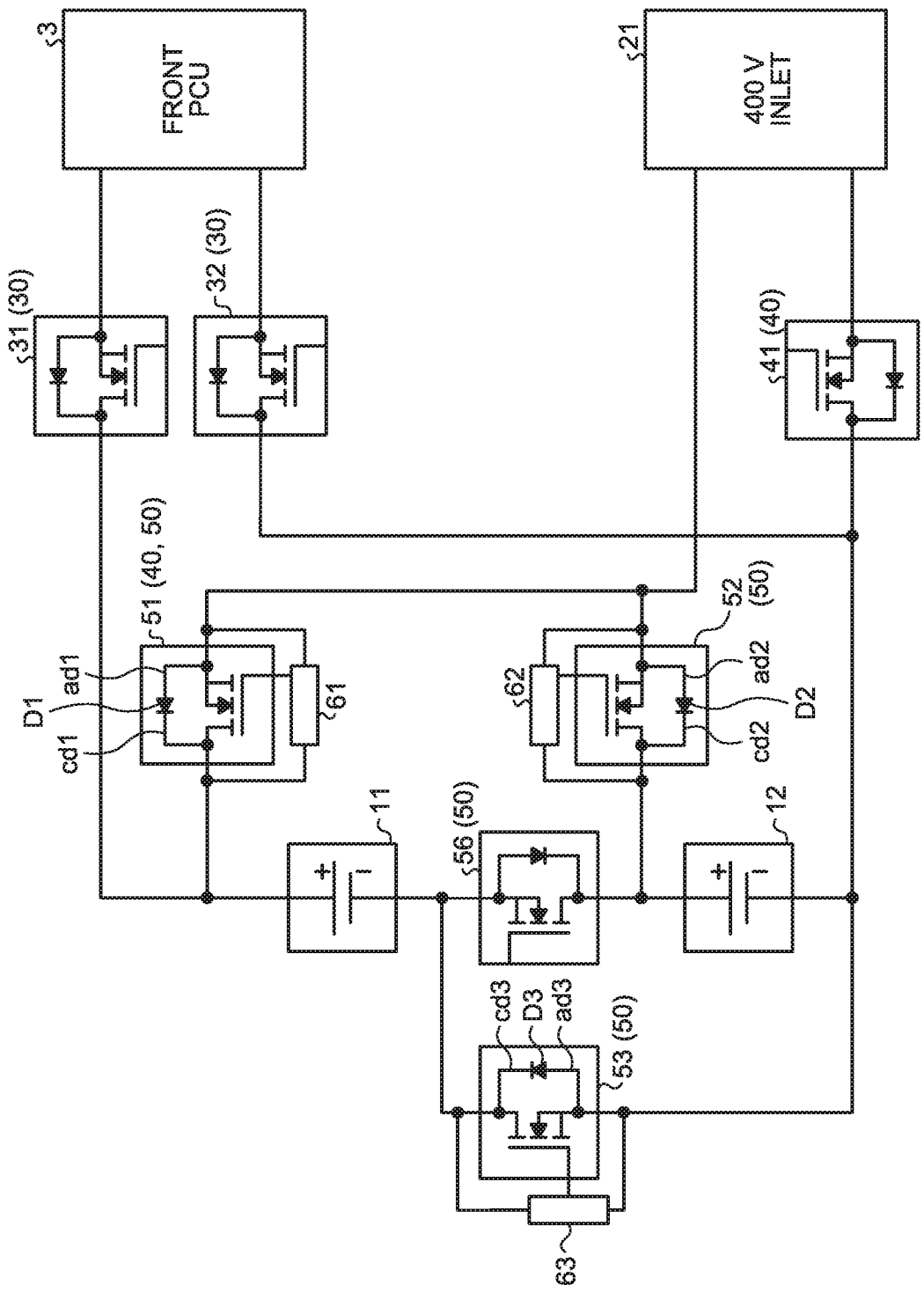
FIG. 5 is a circuit diagram illustrating a configuration example of a part of the power supply device according to the embodiment.
Figure 6:
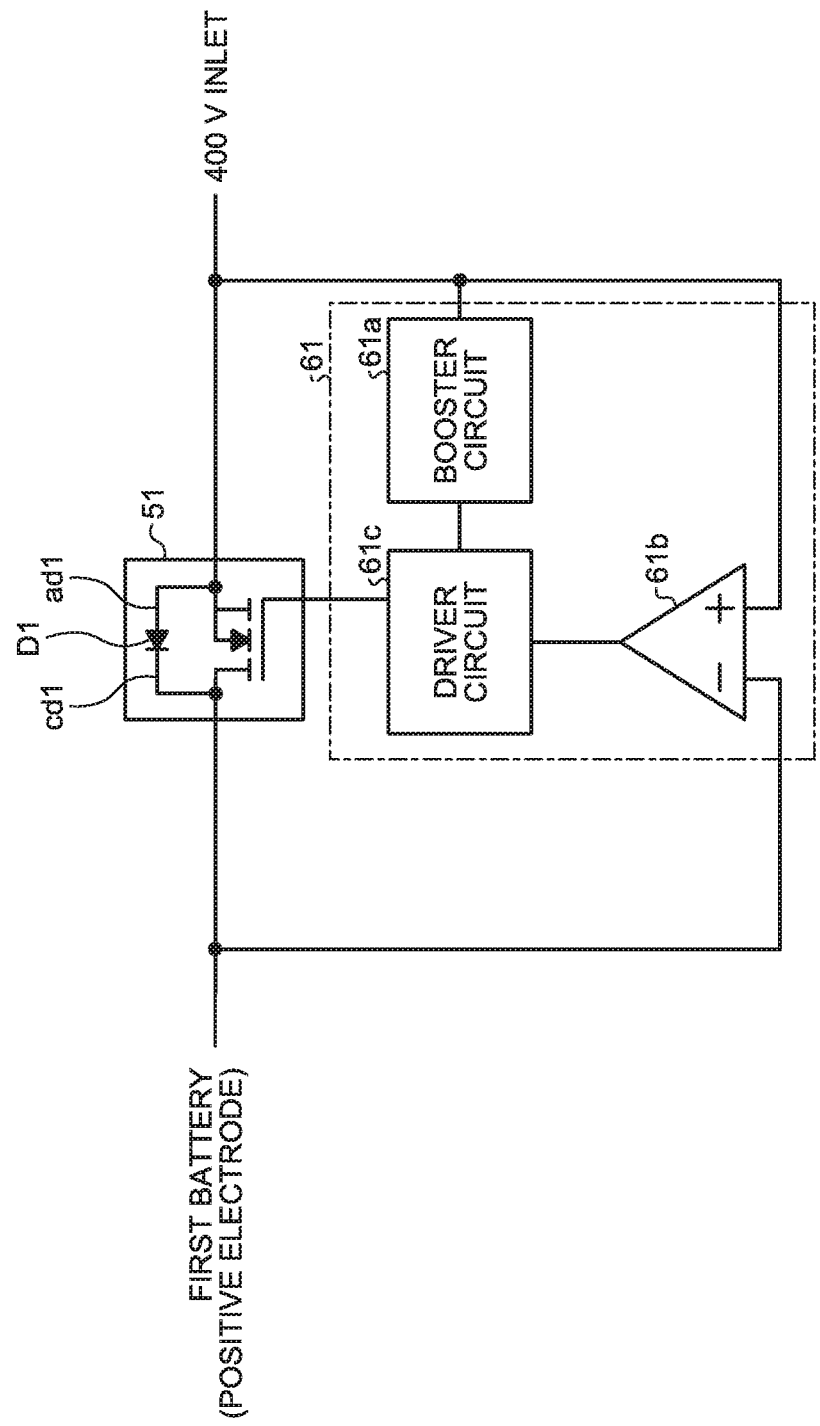
FIG. 6 is a circuit diagram illustrating a configuration example of a voltage monitor circuit according to the embodiment.
Figure 7:
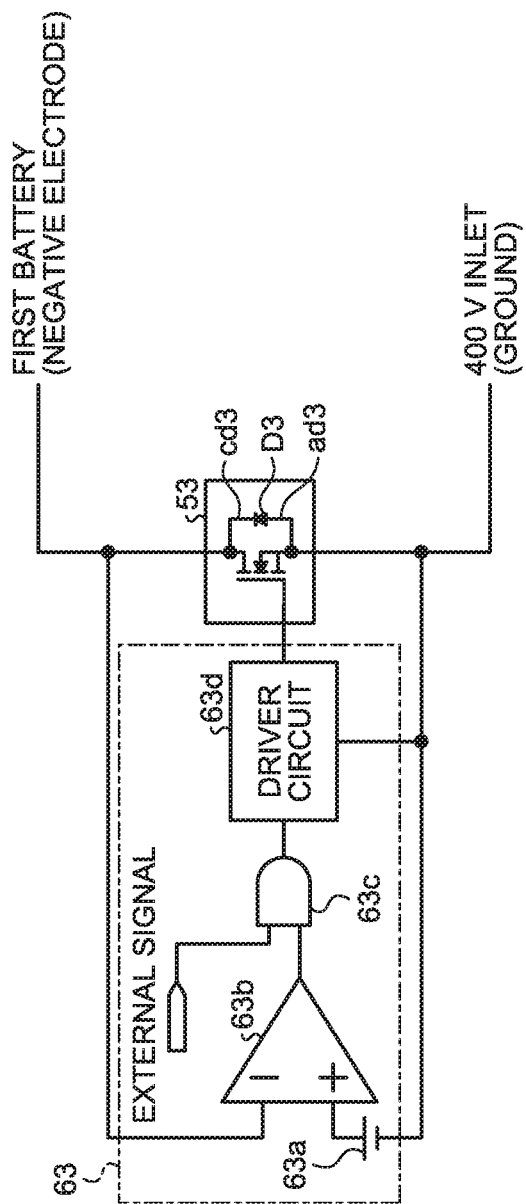
FIG. 7 is a circuit diagram illustrating a configuration example of a voltage monitor circuit according to the embodiment.

A power supply device 1 according to an embodiment will be described with reference to the drawings. FIG. 1 is a schematic diagram illustrating a configuration example of a power supply device 1 according to an embodiment. FIG. 2 is a schematic diagram illustrating a configuration example of a part of the power supply device 1 according to the embodiment. FIG. 3 is a schematic diagram illustrating a configuration example of a series circuit P according to the embodiment. FIG. 4 is a schematic diagram illustrating a configuration example of a parallel circuit Q1 according to the embodiment. FIG. 5 is a circuit diagram illustrating a configuration example of a part of the power supply device 1 according to the embodiment. FIG. 6 is a circuit diagram illustrating a configuration example of a voltage monitor circuit 61 according to the embodiment. FIG. 7 is a circuit diagram illustrating a configuration example of a voltage monitor circuit 63 according to the embodiment.

The power supply device 1 is mounted on a vehicle and supplies power to load units such as a front power control unit (PCU) 3 and a rear PCU 4 provided in the vehicle. The vehicle is, for example, an electric vehicle such as an electric vehicle (EV), a hybrid electric vehicle (HEV), or a plug-in hybrid electric vehicle (PHEV). In the power supply device 1, for example, a connector of an external charger is connected to a 400 V inlet 21 of a vehicle, and a battery unit 10 is charged with power supplied from the external charger via the 400 V inlet 21. The power supply device 1 supplies the charged power to load units such as the front PCU 3 and the rear PCU 4. Hereinafter, the power supply device 1 will be described in detail.

As illustrated in FIGS. 1 to 5, for example, the power supply device 1 includes a battery unit 10, a 400 V inlet 21 as an input unit, a main switching unit 30, a charge switching unit 40, a battery switching unit 50 as a switching unit, and a controller 60.

The battery unit 10 is an assembly of storage batteries capable of charging and discharging DC power. The battery unit 10 is configured to include, for example, a first battery 11 and a second battery 12. The first battery 11 is a storage battery capable of charging and discharging DC power and has a plurality of battery cells. Each battery cell is constituted of a secondary battery capable of charging and discharging, and is constituted of, for example, a lithium ion battery. Each battery cell is connected in series with an adjacent battery cell.

The second battery 12 is constituted in the same manner as the first battery 11. In other words, the second battery 12 is a storage battery capable of charging and discharging DC power, and has a plurality of battery cells. Each battery cell of the second battery 12 is constituted of a secondary battery capable of charging and discharging, and is constituted of, for example, a lithium ion battery. Each battery cell of the second battery 12 is connected in series with an adjacent battery cell. The second battery 12 has the same discharge capacity as the first battery 11.

The battery unit 10 is switched to a series circuit P (see FIG. 3) connecting the first battery 11 and the second battery 12 in series, or a parallel circuit Q1 (see FIG. 4) connecting the first battery and the second battery in parallel. The battery unit 10 is connected to an external charger while being switched to the series circuit P or the parallel circuit Q1, and charges power supplied from the external charger. The battery unit 10 is also connected to the front PCU 3 and the rear PCU 4 while being switched to the series circuit P, and supplies the charged power to the front PCU 3 and the rear PCU 4.

A charging inlet 20 is a charging port for inputting power supplied from an external charger. The charging inlet 20 is configured to include a 400 V inlet 21 and an 800 V inlet 22 as input units (see FIG. 1). The 400 V inlet 21 corresponds to an external charger having a voltage of 400 V. The 400 V inlet 21 is connected to the battery unit 10 via the charge switching unit 40 (charging relay 41, parallel-connected relay 51). The 400 V inlet 21 is electrically connected to an external charger when the connector of the external charger is inserted, and inputs power supplied from the external charger. The 400 V inlet 21 outputs the inputted power to the battery unit 10 via the charge switching unit 40.

The 800 V inlet 22 corresponds to an external charger having a voltage of 800 V. The 800 V inlet 22 is connected to the battery unit 10 via the charge switching unit 40 (charging relays 43 and 44). The 800 V inlet 22 is electrically connected to the external charger when the connector of the external charger is inserted, and inputs power supplied from the external charger. The 800 V inlet 22 outputs the inputted power to the battery unit 10 via the charge switching unit 40.

The main switching unit 30 energizes or interrupts the current flowing between the battery unit 10 and the front PCU 3 and the rear PCU 4. The main switching unit 30 is configured to include a main relay 31, a main relay 32, a main relay 33, and a main relay 34. The main relays 31 to 34 are, for example, an N-channel type metal-oxide-semiconductor field-effect transistor (MOSFET), and energizes or interrupts a current. The main relay 31 is provided between the positive electrode of the first battery 11 and the positive electrode of the front PCU 3. The main relay 31 is turned on by the controller 60 to energize the current flowing from the positive electrode of the first battery 11 to the front PCU 3. The main relay 31 is also turned off by the controller 60 to interrupt the current flowing from the positive electrode of the first battery 11 to the front PCU 3. The main relay 32 is provided between the negative electrode of the second battery 12 and the negative electrode of the front PCU 3. The main relay 32 is turned on by the controller 60 to energize the current flowing from the negative electrode of the second battery 12 to the front PCU 3. The main relay 32 is also turned off by the controller 60 to interrupt the current flowing from the negative electrode of the second battery 12 to the front PCU 3.

The main relay 33 is provided between the positive electrode of the first battery 11 and the positive electrode of the rear PCU 4. The main relay 33 is turned on by the controller 60 to energize the current flowing from the positive electrode of the first battery 11 to the rear PCU 4. The main relay 33 is also turned off by the controller 60 to interrupt the current flowing from the positive electrode of the first battery 11 to the rear PCU 4. The main relay 34 is provided between the negative electrode of the second battery 12 and the negative electrode of the rear PCU 4. The main relay 34 is turned on by the controller 60 to energize the current flowing from the negative electrode of the second battery 12 to the rear PCU 4. The main relay 34 is also turned off by the controller 60 to interrupt the current flowing from the negative electrode of the second battery 12 to the rear PCU 4.

The charge switching unit 40 energizes or interrupts the current flowing between the charging inlet 20 and the battery unit 10. The charge switching unit 40 is configured to include a charging relay 41, a parallel-connected relay 51, a charging relay 43, and a charging relay 44. The charging relays 41, 43 and 44, and the parallel-connected relay 51 are, for example, an N-channel type MOSFET, and energizes or interrupts a current.

The parallel-connected relay 51 is provided between the positive electrode of the first battery 11 and the positive electrode of the 400 V inlet 21. The parallel-connected relay 51 is turned on by the controller 60 to energize the current flowing from the positive electrode of the first battery 11 to the positive electrode of the 400 V inlet 21. The parallel-connected relay 51 is also turned off by the controller 60 to interrupt the current flowing from the positive electrode of the first battery 11 to the positive electrode of the 400 V inlet 21.

The charging relay 41 is provided between the negative electrodes of the first and second batteries 11 and 12 and the negative electrode of the 400 V inlet 21. The charging relay 41 is turned on by the controller 60 to energize the current flowing from the negative electrodes of the first and second batteries 11 and 12 to the negative electrode of the 400 V inlet 21. The charging relay 41 is also turned off by the controller 60 to interrupt the current flowing from the negative electrodes of the first and second batteries 11 and 12 to the negative electrode of the 400 V inlet 21.

The charging relay 43 is provided between the positive electrode of the first battery 11 and the positive electrode of the 800 V inlet 22. The charging relay 43 is turned on by the controller 60 to energize the current flowing from the positive electrode of the first battery 11 to the positive electrode of the 800 V inlet 22. The charging relay 43 is also turned off by the controller 60 to interrupt the current flowing from the positive electrode of the first battery 11 to the positive electrode of the 800 V inlet 22.

The charging relay 44 is provided between the negative electrode of the second battery 12 and the negative electrode of the 800 V inlet 22. The charging relay 44 is turned on by the controller 60 to energize the current flowing from the negative electrode of the second battery 12 to the negative electrode of the 800 V inlet 22. The charging relay 44 is also turned off by the controller 60 to interrupt the current flowing from the negative electrode of the second battery 12 to the negative electrode of the 800 V inlet 22.

The battery switching unit 50 switches the connection between the first battery 11 and the second battery 12. The battery switching unit 50 is configured to include a parallel-connected relay 51, a parallel-connected relay 52, a parallel-connected relay 53, and a series-connected relay 56.

The series-connected relay 56 is provided between the positive electrode of the second battery 12 and the negative electrode of the first battery 11. The series-connected relay 56 is turned on by the controller 60 to energize between the positive electrode of the second battery 12 and the negative electrode of the first battery 11. The series-connected relay 56 is also turned off by the controller 60 to interrupt between the positive electrode of the second battery 12 and the negative electrode of the first battery 11.

The parallel-connected relay 51 is provided between the positive electrode of the first battery 11 and the positive electrode of the 400 V inlet 21. The parallel-connected relay 51 has a first parasitic diode D1, connects a first cathode terminal cd1 of the first parasitic diode D1 to the positive electrode of the first battery 11, and connects a first anode terminal ad1 of the first parasitic diode D1 to the positive electrode of the 400 V inlet 21 and the positive electrode of the second battery 12. The parallel-connected relay 51 is turned on by the controller 60 to energize between the positive electrode of the first battery 11 and both the positive electrode of the 400 V inlet 21 and the positive electrode of the second battery 12. The parallel-connected relay 51 is also turned off by the controller 60 to interrupt between the positive electrode of the first battery 11 and both the positive electrode of the 400 V inlet 21 and the positive electrode of the second battery 12.

The parallel-connected relay 52 is provided between the positive electrode of the second battery 12 and the positive electrode of the 400 V inlet 21. The parallel-connected relay 52 has a second parasitic diode D2, connects a second cathode terminal cd2 of the second parasitic diode D2 to the positive electrode of the second battery 12, and connects a second anode terminal ad2 of the second parasitic diode D2 to the positive electrode of the 400 V inlet 21 and the positive electrode of the first battery 11. The parallel-connected relay 52 is turned on by the controller 60 to energize between the positive electrode of the second battery 12 and both the positive electrode of the 400 V inlet 21 and the positive electrode of the first battery 11. The parallel-connected relay 52 is also turned off by the controller 60 to interrupt between the positive electrode of the second battery 12 and both the positive electrode of the 400 V inlet 21 and the positive electrode of the first battery 11.

The parallel-connected relay 53 is provided between the negative electrode of the first battery 11 and the negative electrode of the second battery 12. The parallel-connected relay 53 has a third parasitic diode D3. A third cathode terminal cd3 of the third parasitic diode D3 is connected to the negative electrode of the first battery 11 and connected to the positive electrode of the second battery 12 via the series-connected relay 56. A third anode terminal ad3 of the third parasitic diode D3 is connected to the negative electrode of the second battery 12 and connected to the negative electrode of the 400 V inlet 21 via the charging relay 41. The parallel-connected relay 53 is turned on by the controller 60 to energize between the negative electrode of the first battery 11 and both the negative electrode of the second battery 12 and the negative electrode of the 400 V inlet 21. The parallel-connected relay 53 is also turned off by the controller 60 to interrupt between the negative electrode of the first battery 11 and both the negative electrode of the second battery 12 and the negative electrode of the 400 V inlet 21.

The battery switching unit 50 switches the parallel-connected relay 51, the parallel-connected relay 52, the parallel-connected relay 53, and the series-connected relay 56 to switch to the series circuit P connecting the first battery 11 and the second battery 12 in series, or to the parallel circuit Q1 connecting the first battery 11 and the second battery 12 in parallel.

For example, as illustrated in FIG. 3, the battery switching unit 50 turns on the series-connected relay 56 and turns off the parallel-connected relay 51, the parallel-connected relay 52, and the parallel-connected relay 53, thereby forming the series circuit P connecting the first battery 11 and the second battery 12 in series. Further, as illustrated in FIG. 4, the battery switching unit 50 turns on the parallel-connected relay 51, the parallel-connected relay 52, and the parallel-connected relay 53, and turns off the series-connected relay 56, thereby forming the parallel circuit Q1 connecting the first battery 11 and the second battery 12 in parallel.

The controller 60 controls the main switching unit 30, the charge switching unit 40, and the battery switching unit 50. The controller 60 is configured to include an electronic circuit mainly composed of a well-known microcomputer including a CPU, a ROM and a RAM constituting a storage unit, and an interface. The controller 60 controls the main switching unit 30 to energize or interrupt the current flowing between the battery unit 10 and both the front PCU 3 and the rear PCU 4. The controller 60 controls the charge switching unit 40 to energize or interrupt the current flowing between the 400 V inlet 21 or the 800 V inlet 22 and the battery unit 10. The controller 60 controls the battery switching unit 50 to switch the connection between the first battery 11 and the second battery 12 to the series circuit P or the parallel circuit Q1.

The controller 60 is configured to include voltage monitor circuits 61 to 63 (see FIG. 5). The voltage monitor circuit 61 monitors the voltage of the parallel-connected relay 51. The voltage monitor circuit 61 controls the parallel-connected relay 51 based on voltages applied to the first cathode terminal cd1 and the first anode terminal ad1. As illustrated in FIG. 6, the voltage monitor circuit 61 includes a booster circuit 61a, a comparator circuit 61b, and a driver circuit 61c. The booster circuit 61a is connected to the 400 V inlet 21 and the driver circuit 61c, and boosts the driver circuit 61c based on the power supplied from the 400 V inlet 21.

The comparator circuit 61b outputs the comparison result of the voltage applied between the terminals of the parallel-connected relay 51. The comparator circuit 61b connects the positive electrode terminal to the first anode terminal ad1 of the first parasitic diode D1 and connects a negative electrode terminal to the first cathode terminal cd1 of the first parasitic diode D1. The comparator circuit 61b outputs the comparison result between the voltage applied to the first cathode terminal cd1 and the voltage applied to the first anode terminal ad1 to the driver circuit 61c. For example, when the voltage applied to the first cathode terminal cd1 is less than the voltage applied to the first anode terminal ad1, the comparator circuit 61b outputs an ON signal for turning on the parallel-connected relay 51 to the driver circuit 61c. On the other hand, when the voltage applied to the first cathode terminal cd1 is equal to or higher than the voltage applied to the first anode terminal ad1, the comparator circuit 61b outputs an OFF signal for turning off the parallel-connected relay 51 to the driver circuit 61c.

The driver circuit 61c turns on or off the parallel-connected relay 51. The driver circuit 61c is connected to the output terminal of the comparator circuit 61b and the gate terminal of the parallel-connected relay 51, and turns on or off the parallel-connected relay 51 based on the comparison result of the comparator circuit 61b. For example, when an ON signal is outputted from the comparator circuit 61b, the driver circuit 61c applies an ON voltage to the gate terminal of the parallel-connected relay 51 to turn on the parallel-connected relay 51. Thus, it is energized between the positive electrode of the first battery 11 and both the positive electrode of the 400 V inlet 21 and the positive electrode of the second battery 12. On the other hand, when an OFF signal is outputted from the comparator circuit 61b, the driver circuit 61c applies an OFF voltage to the gate terminal of the parallel-connected relay 51 to turn off the parallel-connected relay 51. Thus, the positive electrode of the first battery 11, the positive electrode of the 400 V inlet 21 and the positive electrode of the second battery 12 are interrupted.

As illustrated in FIG. 5, a voltage monitor circuit 62 monitors the voltage of the parallel-connected relay 52. The voltage monitor circuit 62 has the same configuration and operation as the voltage monitor circuit 61. In other words, the voltage monitor circuit 62 controls the parallel-connected relay 52 based on voltages applied to the second cathode terminal cd2 and the second anode terminal ad2. For example, when the voltage applied to the second cathode terminal cd2 is less than the voltage applied to the second anode terminal ad2, the voltage monitor circuit 62 turns on the parallel-connected relay 52 to energize between the positive electrode of the second battery 12 and both the positive electrode of the 400 V inlet 21 and the positive electrode of the first battery 11. On the other hand, when the voltage applied to the second cathode terminal cd2 is equal to or higher than the voltage applied to the second anode terminal ad2, the voltage monitor circuit 62 turns off the parallel-connected relay 52 to interrupt between the positive electrode of the second battery 12 and both the positive electrode of the 400 V inlet 21 and the positive electrode of the first battery 11.

As illustrated in FIG. 5, the voltage monitor circuit 63 monitors the voltage of the parallel-connected relay 53. As illustrated in FIG. 7, for example, the voltage monitor circuit 63 has an offset power supply 63a, a comparator circuit 63b, an AND circuit 63c, and a driver circuit 63d. The offset power supply 63a is a power supply for applying a predetermined voltage (for example, 10 V) to the positive electrode of the comparator circuit 63*b*. When the series-connected relay 56 is turned off, the offset power supply 63*a* applies a predetermined voltage (for example, 10 V) to the side of the third anode terminal ad3 in order to turn on the parallel-connected relay 53, although there is no potential difference between the third cathode terminal cd3 and the third anode terminal ad3 of the parallel-connected relay 53. In other words, the offset power supply 63*a* applies a predetermined voltage (for example, 10 V) to the side of the third anode terminal ad3 in order to satisfy the condition of turning on, when the potential difference between the third anode terminal ad3 and the third cathode terminal cd3 is zero and the voltage of the third anode terminal ad3 is higher than the voltage of the third cathode terminal cd3.

The comparator circuit 63*b* outputs the comparison result of the voltage applied between the terminals of the parallel-connected relay 53. The comparator circuit 63*b* connects the positive electrode terminal to the third anode terminal ad3 of the third parasitic diode D3 via the offset power supply 63*a* and connects the negative electrode terminal to the third cathode terminal cd3 of the third parasitic diode D3. The comparator circuit 63*b* outputs the comparison result between the voltage applied to the third cathode terminal cd3 and the voltage applied to the third anode terminal ad3 to the AND circuit 63*c*. For example, when the voltage applied to the third cathode terminal cd3 is less than the voltage applied to the third anode terminal ad3, the comparator circuit 63*b* outputs an ON signal for turning on the parallel-connected relay 53 to the AND circuit 63*c*. On the other hand, when the voltage applied to the third cathode terminal cd3 is equal to or higher than the voltage applied to the third anode terminal ad3, the comparator circuit 63*b* outputs an OFF signal for turning off the parallel-connected relay 53 to the AND circuit 63*c*.

The AND circuit 63*c* is a circuit for calculating the AND of the two signals. The AND circuit 63*c* calculates an AND of an external signal for turning on or off the parallel-connected relay 53 and an ON signal or an OFF signal outputted from the comparator circuit 63*b*. The external signal is a signal for preventing a short circuit by making the parallel-connected relay 53 in an OFF state before turning on the series-connected relay 56 when switching from the parallel circuit Q1 to the series circuit P. The AND circuit 63*c* outputs an ON signal for turning on the parallel-connected relay 53 to the driver circuit 63*d* when the external signal is an ON and the ON signal is outputted from the comparator circuit 63*b*. On the other hand, the AND circuit 63*c* outputs an OFF signal for turning off the parallel-connected relay 53 to the driver circuit 63*d* when at least one of the external signals and the signal outputted from the comparator circuit 63*b* is an OFF.

The driver circuit 63*d* turns on or off the parallel-connected relay 53. The driver circuit 63*d* is connected to the output terminal of the AND circuit 63*c* and the gate terminal of the parallel-connected relay 53, and turns on or off the parallel-connected relay 53 based on the output result of the AND circuit 63*c*. For example, when an ON signal is outputted from the AND circuit 63*c*, the driver circuit 63*d* applies an ON voltage to the gate terminal of the parallel-connected relay 53 to turn on the parallel-connected relay 53. Thus, the positive electrode and the negative electrode of the second battery 12 are energized. On the other hand, when an OFF signal is outputted from the AND circuit 63*c*, the driver circuit 63*d* applies an OFF voltage to the gate terminal of the parallel-connected relay 53 to turn off the parallel-connected relay 53. Thus, the positive electrode and the negative electrode of the second battery 12 are interrupted.

Figure 8:
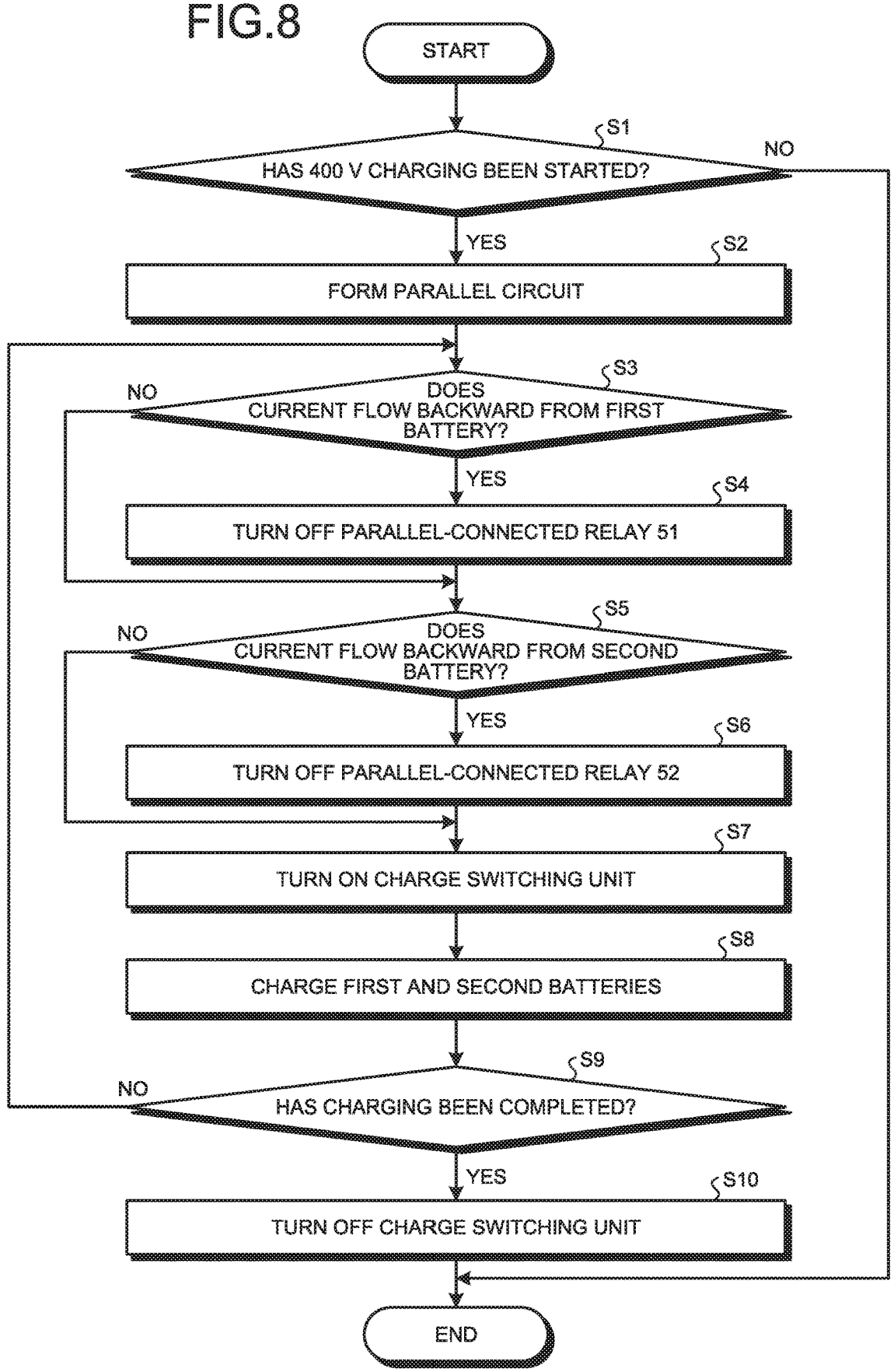
FIG. 8 is a flowchart illustrating an operation example of 400 V charging according to the embodiment.

Next, an operation example of 400 V charging of the power supply device 1 will be described. FIG. 8 is a flowchart illustrating an operation example of 400 V charging according to the embodiment. In the power supply device 1, the controller 60 determines whether or not 400 V charging has been started (step S1). For example, when the voltage on the 400 V inlet 21 side is higher than the voltage on the battery unit 10 side in the parallel-connected relays 51 and 52, the controller 60 determines that the connector of the external charger is connected to the 400 V inlet 21 and charging is started. Specifically, when the voltage applied to the first anode terminal ad1 in the voltage monitor circuit 61 is equal to or higher than the voltage applied to the first cathode terminal cd1 and the voltage applied to the second anode terminal ad2 in the voltage monitor circuit 62 is equal to or higher than the voltage applied to the second cathode terminal cd2, the controller 60 determines that charging is started.

When 400 V charging is started (step S1; Yes), the controller 60 forms the parallel circuit Q1 (step S2). For example, the controller 60 turns on the parallel-connected relay 51, the parallel-connected relay 52 and the parallel-connected relay 53, and turns off the series-connected relay 56, thereby forming the parallel circuit Q1 connecting the first battery 11 and the second battery 12 in parallel.

Next, the controller 60 determines whether or not the current flows backward from the first battery 11 (step S3). For example, when the voltage applied to the first cathode terminal cd1 in the voltage monitor circuit 61 is equal to or higher than the voltage applied to the first anode terminal ad1, the controller 60 determines that the current flows backward from the first battery 11 (step S3; Yes), and turns off the parallel-connected relay 51 (step S4). On the other hand, when the voltage applied to the first cathode terminal cd1 is less than the voltage applied to the first anode terminal ad1, the controller 60 determines that the current does not flow backward from the first battery 11 (step S3; No), and continues to turn on the parallel-connected relay 51.

Next, the controller 60 determines whether or not the current flows backward from the second battery 12 (step S5) For example, when the voltage applied to the second cathode terminal cd2 in the voltage monitor circuit 62 is equal to or higher than the voltage applied to the second anode terminal ad2, the controller 60 determines that the current flows backward from the second battery 12 (step S5; Yes), and turns off the parallel-connected relay 52 (step S6). On the other hand, when the voltage applied to the second cathode terminal cd2 is less than the voltage applied to the second anode terminal ad2, the controller 60 determines that the current does not flow backward from the second battery 12 (step S5; No), and continues to turn on the parallel-connected relay 52.

Next, the controller 60 turns on the charge switching unit 40 (step S7). The controller 60, for example, turns on the charging relay 41 to charge the first and second batteries 11 and 12 constituting the parallel circuit Q (step S8). Next, the controller 60 determines whether or not charging has been completed (step S9). The controller 60, when charging is completed (step S9; Yes), turns off the charge switching unit 40 to terminate the 400 V charging process. The controller 60, when charging has not been completed (step S9; No), returns to the above-described step S3 and determines again whether or not the current flows backward from the first battery 11. In the above-described step S1, when the 400 V charging has not started (step S1; No), the controller 60 terminates the 400 V charging process.

As described above, the power supply device 1 according to the embodiment includes the first battery 11, the second battery 12, the battery switching unit 50, the charging inlet 20, and the controller 60. The first battery 11 is a storage battery mounted on a vehicle and capable of storing electric power. The second battery 12 is a storage battery mounted on said vehicle and capable of storing electric power. The battery switching unit 50 is a circuit capable of switching the series-connected relay 56, the parallel-connected relay 51, the parallel-connected relay 52 and the parallel-connected relay 53 to switch to a series circuit P connecting the first battery 11 and the second battery 12 in series or a parallel circuit Q1 connecting the first battery 11 and the second battery 12 in parallel. The charging inlet 20 is connected to an external charger to input power supplied from the external charger. The controller 60 controls the battery switching unit 50 to switch to the series circuit P or the parallel circuit Q1.

The series-connected relay 56 is provided between the positive electrode of the second battery 12 and the negative electrode of the first battery 11, and energizes or interrupts between the positive electrode of the second battery 12 and the negative electrode of the first battery 11. The parallel-connected relay 51 has a first parasitic diode D1, connects the first cathode terminal cd1 of the first parasitic diode D1 to the positive electrode of the first battery 11, and connects the first anode terminal ad1 of the first parasitic diode D1 to the positive electrode of the charging inlet 20 to energize or interrupt between the positive electrode of the first battery 11 and the positive electrode of the charging inlet 20. The parallel-connected relay 52 has a second parasitic diode D2, connects the second cathode terminal cd2 of the second parasitic diode D2 to the positive electrode of the second battery 12, and connects the second anode terminal ad2 of the second parasitic diode D2 to the positive electrode of the charging inlet 20 to energize or interrupt between the positive electrode of the second battery 12 and the positive electrode of the charging inlet 20. The parallel-connected relay 53 is provided between the negative electrode of the first battery 11 and the negative electrode of the second battery 12, and energizes or interrupts between the negative electrode of the first battery 11 and the negative electrode of the second battery 12. When charging the first battery 11 and the second battery 12, the controller 60 controls the battery switching unit 50 to switch to the parallel circuit Q1, controls the parallel-connected relay 51 based on the voltages applied to the first cathode terminal cd1 and the first anode terminal ad1, and further controls the parallel-connected relay 52 based on the voltages applied to the second cathode terminal cd2 and the second anode terminal ad2.

This configuration enables the power supply device 1 to inhibit the current (inrush current) flowing backward from one of the first battery 11 or the second battery 12 to the other when the battery is charged by forming the parallel circuit Q1 in a state where the charging rate of the first battery 11 is different from the charging rate of the second battery 12. In this case, since the power supply device 1 does not need to determine the order of turning on the relays as in the prior art, the complicated operation of the device can be reduced. Since the power supply device 1 reduces the reverse flow by the parallel-connected relays 51 and 52, the loss can be reduced as compared with the case of reducing the reverse flow by the conventional diode. In the power supply device 1, since the parallel-connected relay 51 also functions as a relay for charging, an increase in the number of relays can be suppressed, and an increase in the size of the device can be suppressed. In the power supply device 1, when the series-connected relay 56 is turned on, the voltage of the first cathode terminal cd1 becomes larger than the voltage of the first anode terminal ad1 and the parallel-connected relay 51 is turned off, so that the parallel-connected relay 51 and the series-connected relay 56 can be prevented from being turned on simultaneously and the short circuit of the first battery 11 can be prevented. The power supply device 1 can supply power to a load unit by forming a series circuit P. As a result, the power supply device 1 can be properly charged and discharged.

In the power supply device 1 described above, when, in charging the first battery 11 and the second battery 12 constituting the parallel circuit Q1, the voltage applied to the first cathode terminal cd1 is less than the voltage applied to the first anode terminal ad1, the controller 60 turns on the parallel-connected relay 51 to energize between the positive electrode of the first battery 11 and the positive electrode of the charging inlet 20. On the other hand, when the voltage applied to the first cathode terminal cd1 is equal to or higher than the voltage applied to the first anode terminal ad1, the controller 60 turns off the parallel-connected relay 51 to interrupt between the positive electrode of the first battery 11 and the positive electrode of the charging inlet 20. Similarly, when the voltage applied to the second cathode terminal cd2 is less than the voltage applied to the second anode terminal ad2, the controller 60 turns on the parallel-connected relay 52 to energize between the positive electrode of the second battery 12 and the positive electrode of the charging inlet 20. On the other hand, when the voltage applied to the second cathode terminal cd2 is equal to or higher than the voltage applied to the second anode terminal ad2, the controller 60 turns off the parallel-connected relay 52 to interrupt between the positive electrode of the second battery 12 and the positive electrode of the charging inlet 20.

This configuration enables the power supply device 1 to inhibit the current flowing backward from the positive electrode of the first battery 11 to the positive electrode of the second battery 12, even if the parallel circuit Q1 is formed, for example, when the charging rate of the first battery 11 is higher than the charging rate of the second battery 12. Further, even if the parallel circuit Q1 is formed when the charging rate of the second battery 12 is higher than the charging rate of the first battery 11, the power supply device 1 can inhibit the current flowing backward from the positive electrode of the second battery 12 to the positive electrode of the first battery 11.

In the power supply device 1 described above, the parallel-connected relay 53 has a third parasitic diode D3, connects the third cathode terminal cd3 of the third parasitic diode D3 to the positive electrode of the second battery 12 via the series-connected relay 56, and connects the third anode terminal ad3 of the third parasitic diode D3 to the negative electrode of the second battery 12. When the voltage applied to the third cathode terminal cd3 is less than the voltage applied to the third anode terminal ad3, the controller 60 turns on the parallel-connected relay 53 to energize between the positive electrode and the negative electrode of the second battery 12. On the other hand, when the voltage applied to the third cathode terminal cd3 is equal to or higher than the voltage applied to the third anode terminal ad3, the controller 60 turns off the parallel-connected relay 53 to interrupt between the positive electrode and the negative electrode of the second battery 12. This configuration enables the power supply device 1 to prevent the second battery 12 from short-circuiting.

Modification

Figure 9:
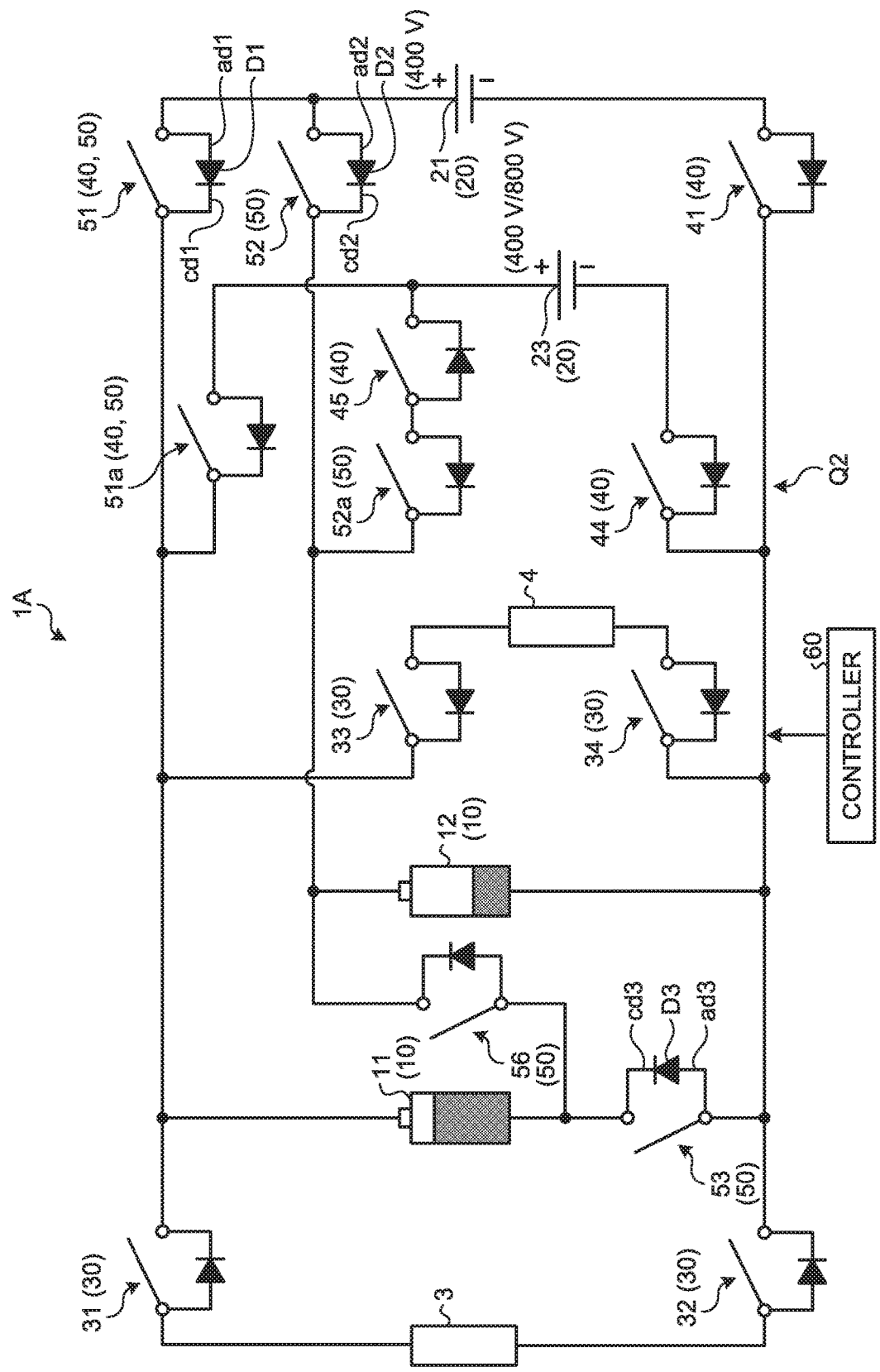
FIG. 9 is a schematic diagram illustrating a configuration example of a power supply device according to a modification of the embodiment.

Next, a modification of the embodiment will be described. In the modification of the embodiment, components equivalent to those of the embodiment are denoted by the same reference numerals, and a detailed description thereof is omitted. FIG. 9 is a schematic diagram illustrating a configuration example of a power supply device 1A according to a modification of the embodiment. The power supply device 1A differs from the power supply device 1 of the embodiment in that the power supply device 1A includes a common inlet 23 corresponding to external chargers having voltages of 400 V and 800 V.

In the power supply device 1A, the charge switching unit 40 is further configured to include a charging relay 45. The charging relay 45 is provided between the positive electrode of the common inlet 23 and the positive electrode of the second battery 12. The charging relay 45 is turned on by the controller 60 when charging 400 V via the common inlet 23 to energize the current flowing from the positive electrode of the common inlet 23 to the positive electrode of the second battery 12. The charging relay 43 is turned off by the controller 60 when charging 800 V via the common inlet 23 to interrupt the current flowing from the positive electrode of the common inlet 23 to the positive electrode of the second battery 12.

In the power supply device 1A, the battery switching unit 50 is further configured to include a parallel-connected relay 51a, a parallel-connected relay 52a, and a parallel-connected relay 53. The battery switching unit 50 can switch the parallel-connected relay 51a, the parallel-connected relay 52a, and the parallel-connected relay 53 to switch to a parallel circuit Q2 as a second parallel circuit connecting the first battery 11 and the second battery 12 in parallel. The battery switching unit 50, for example, turns on the parallel-connected relay 51a, the parallel-connected relay 52a, and the parallel-connected relay 53 and turns off the series-connected relay 56, thereby forming the parallel circuit Q2 connecting the first battery 11 and the second battery 12 in parallel.

When charging the first battery 11 and the second battery 12 at 400 V, the controller 60 controls the battery switching unit 50, charges by one circuit of the parallel circuit Q1 or the parallel circuit Q2, and does not charge by the other circuit of the parallel circuit Q1 or the parallel circuit Q2. For example, when charging the first battery 11 and the second battery 12 at 400 V via the 400 V inlet 21, the controller 60 controls the battery switching unit 50 to form the parallel circuit Q1, charges by the parallel circuit Q1, and does not charge by the circuit of the parallel circuit Q2. On the other hand, when charging the first battery 11 and the second battery 12 at 400 V via the common inlet 23, the controller 60 controls the battery switching unit 50 to form the parallel circuit Q2, charges by the parallel circuit Q2, and does not charge by the circuit of the parallel circuit Q1.

As described above, in the power supply device 1A according to the modification of the embodiment, the battery switching unit 50 can switch the parallel-connected relay 51a, the parallel-connected relay 52a, and the parallel-connected relay 53 to switch to a parallel circuit Q2 connecting the first battery 11 and the second battery 12 in parallel. When charging the first battery 11 and the second battery 12, the controller 60 controls the battery switching unit 50, charges by one circuit of the parallel circuit Q1 or the parallel circuit Q2 and does not charge by the other circuit of the parallel circuit Q1 or the parallel circuit Q2. Thus, the power supply device 1A may be configured to include a common inlet 23 corresponding to external chargers having voltages of 400 V and 800 V.

Note that the above description has described an example in which each relay is an N-channel type MOSFET, but is not limited thereto, and other switches may be used.

The power supply device according to the present embodiment can inhibit a current flowing backward from one of the first battery and the second battery to the other when the battery is charged by forming a parallel circuit in a state where the charging rate of the first battery and the charging rate of the second battery are different, and thus enabling to charge and discharge properly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device comprising:
a first battery mounted on a vehicle and capable of storing electric power;
a second battery mounted on the vehicle and capable of storing electric power;
a switching unit capable of switching a series-connected switch, a first parallel-connected switch, a second parallel-connected switch and a third parallel-connected switch to switch to a series circuit connecting the first battery and the second battery in series or a first parallel circuit connecting the first battery and the second battery in parallel;
an input unit that is connected to an external charger, and inputs electric power supplied from the external charger; and
a controller configured to control the switching unit to switch to the series circuit or the first parallel circuit, wherein
the series-connected switch is provided between a positive electrode of the second battery and a negative electrode of the first battery, and energizes or interrupts between the positive electrode of the second battery and the negative electrode of the first battery,
the first parallel-connected switch has a first parasitic diode, a first cathode terminal of the first parasitic diode is connected to a positive electrode of the first battery, and a first anode terminal of the first parasitic diode is connected to a positive electrode of the input unit to energize or interrupt between the positive electrode of the first battery and the positive electrode of the input unit,
the second parallel-connected switch has a second parasitic diode, a second cathode terminal of the second parasitic diode is connected to the positive electrode of the second battery, and a second anode terminal of the second parasitic diode is connected to the positive electrode of the input unit to energize or interrupt between the positive electrode of the second battery and the positive electrode of the input unit,
the third parallel-connected switch is provided between the negative electrode of the first battery and a negative electrode of the second battery, and energizes or interrupts between the negative electrode of the first battery and the negative electrode of the second battery, and
when charging the first battery and the second battery, the controller controls the switching unit to switch to the first parallel circuit, controls the first parallel-connected switch based on voltages applied to the first cathode terminal and the first anode terminal, and further controls the second parallel-connected switch based on voltages applied to the second cathode terminal and the second anode terminal.

2. The power supply device according to claim 1, wherein
when, in charging the first battery and the second battery, the voltage applied to the first cathode terminal is less than the voltage applied to the first anode terminal, the controller turns on the first parallel-connected switch to energize between the positive electrode of the first battery and the positive electrode of the input unit,
when the voltage applied to the first cathode terminal is equal to or higher than the voltage applied to the first anode terminal, the controller turns off the first parallel-connected switch to interrupt between the positive electrode of the first battery and the positive electrode of the input unit,
when the voltage applied to the second cathode terminal is less than the voltage applied to the second anode terminal, the controller turns on the second parallel-connected switch to energize between the positive electrode of the second battery and the positive electrode of the input unit, and
when the voltage applied to the second cathode terminal is equal to or higher than the voltage applied to the second anode terminal, the controller turns off the second parallel-connected switch to interrupt between the positive electrode of the second battery and the positive electrode of the input unit.

3. The power supply device according to claim 1, wherein
the third parallel-connected switch has a third parasitic diode, a third cathode terminal of the third parasitic diode is connected to the positive electrode of the second battery via the series-connected switch, and a third anode terminal of the third parasitic diode is connected to the negative electrode of the second battery,
when a voltage applied to the third cathode terminal is less than a voltage applied to the third anode terminal, the controller turns on the third parallel-connected switch to energize between the positive electrode and the negative electrode of the second battery, and
when the voltage applied to the third cathode terminal is equal to or higher than the voltage applied to the third anode terminal, the controller turns off the third parallel-connected switch to interrupt between the positive electrode and the negative electrode of the second battery.

4. The power supply device according to claim 2, wherein
the third parallel-connected switch has a third parasitic diode, a third cathode terminal of the third parasitic diode is connected to the positive electrode of the second battery via the series-connected switch, and a third anode terminal of the third parasitic diode is connected to the negative electrode of the second battery,
when a voltage applied to the third cathode terminal is less than a voltage applied to the third anode terminal, the controller turns on the third parallel-connected switch to energize between the positive electrode and the negative electrode of the second battery, and
when the voltage applied to the third cathode terminal is equal to or higher than the voltage applied to the third anode terminal, the controller turns off the third parallel-connected switch to interrupt between the positive electrode and the negative electrode of the second battery.

5. The power supply device according to claim 1, wherein
the switching unit can switch a fourth parallel-connected switch, a fifth parallel-connected switch, and the third parallel-connected switch to switch to a second parallel circuit connecting the first battery and the second battery in parallel, and
when charging the first battery and the second battery, the controller controls the switching unit, charges by one circuit of the first parallel circuit or the second parallel circuit, and does not charge by another circuit of the first parallel circuit or the second parallel circuit.

6. The power supply device according to claim 2, wherein
the switching unit can switch a fourth parallel-connected switch, a fifth parallel-connected switch, and the third parallel-connected switch to switch to a second parallel circuit connecting the first battery and the second battery in parallel, and
when charging the first battery and the second battery, the controller controls the switching unit, charges by one circuit of the first parallel circuit or the second parallel circuit, and does not charge by another circuit of the first parallel circuit or the second parallel circuit.

7. The power supply device according to claim 3, wherein
the switching unit can switch a fourth parallel-connected switch, a fifth parallel-connected switch, and the third parallel-connected switch to switch to a second parallel circuit connecting the first battery and the second battery in parallel, and
when charging the first battery and the second battery, the controller controls the switching unit, charges by one circuit of the first parallel circuit or the second parallel circuit, and does not charge by another circuit of the first parallel circuit or the second parallel circuit.

8. The power supply device according to claim 4, wherein
the switching unit can switch a fourth parallel-connected switch, a fifth parallel-connected switch, and the third parallel-connected switch to switch to a second parallel circuit connecting the first battery and the second battery in parallel, and
when charging the first battery and the second battery, the controller controls the switching unit, charges by one circuit of the first parallel circuit or the second parallel circuit, and does not charge by another circuit of the first parallel circuit or the second parallel circuit.

* * * * *